US008958085B2

(12) United States Patent
Matsushita

(10) Patent No.: US 8,958,085 B2
(45) Date of Patent: Feb. 17, 2015

(54) IMAGE PROCESSING SYSTEM, IMAGE FORMING APPARATUS, IMAGE PROCESSING PROGRAM, AND IMAGE PROCESSING METHOD

(71) Applicant: Kouichirou Matsushita, Kokubunji (JP)

(72) Inventor: Kouichirou Matsushita, Kokubunji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 13/748,818

(22) Filed: Jan. 24, 2013

(65) Prior Publication Data
US 2013/0188211 A1 Jul. 25, 2013

(30) Foreign Application Priority Data
Jan. 25, 2012 (JP) ................. 2012-013003

(51) Int. Cl.
*G06F 15/00* (2006.01)
*G06K 15/02* (2006.01)
*G06K 15/00* (2006.01)
*G06F 3/12* (2006.01)

(52) U.S. Cl.
CPC .......... *G06K 15/1856* (2013.01); *G06K 15/002* (2013.01); *G06K 15/1848* (2013.01); *G06F 3/1208* (2013.01); *G06F 3/1247* (2013.01); *G06F 3/1256* (2013.01); *G06F 3/1285* (2013.01)
USPC ....................................... 358/1.13

(58) Field of Classification Search
USPC ............................................. 358/1.13
See application file for complete search history.

(56) References Cited

U.S. PATENT DOCUMENTS

| 8,074,180 | B2 | 12/2011 | Yamada | |
|---|---|---|---|---|
| 2002/0063877 | A1* | 5/2002 | Lucivero et al. | 358/1.13 |
| 2010/0020351 | A1 | 1/2010 | Ishizuka | |
| 2011/0255124 | A1* | 10/2011 | Klassen | 358/1.15 |
| 2011/0261379 | A1* | 10/2011 | Mail | 358/1.13 |

FOREIGN PATENT DOCUMENTS

| JP | 11203072 A | 7/1999 |
|---|---|---|
| JP | 2000-181668 A | 6/2000 |
| JP | 2006-277605 A | 10/2006 |
| JP | 2010034683 A | 2/2010 |

OTHER PUBLICATIONS

Japanese Office Action dated Feb. 4, 2014 (and English translation thereof) issued in counterpart Japanese Application No. 2012-013003.
Japanese Office Action dated Sep. 2, 2014, issued in counterpart Japanese Application No. 2012-013003.

* cited by examiner

*Primary Examiner* — Saeid Ebrahimi Dehkordy
(74) *Attorney, Agent, or Firm* — Holtz, Holtz, Goodman & Chick PC

(57) ABSTRACT

An image processing system includes a plurality of different rasterization processing units, a print image data acquiring unit, and a display image generating unit. The rasterization processing units each perform a rasterization process on print data to generate print image data. The print image data acquiring unit acquires at least one piece of print image data selectively using the plurality of rasterization processing unit. The display image generating unit generates a display image of each of the plurality of print image data.

3 Claims, 8 Drawing Sheets

IMAGE PROCESSING SYSTEM, IMAGE FORMING APPARATUS, IMAGE PROCESSING PROGRAM, AND IMAGE PROCESSING METHOD

CROSS-REFERENCE TO RELATED APPLICATION

This application is based on Japanese Patent Application No. 2012-13003 filed on Jan. 25, 2012, the contents of which are incorporated herein by reference.

BACKGROUND

1. Technical Field

The present invention relates to an image processing system, an image forming apparatus, an image processing program, and an image processing method.

2. Description of Related Art

In recent years, functions of a rasterization processing unit that generates print image data from print data described in a printer language have continued to expand.

The rasterization processing unit (hereinafter, referred to as a new rasterization processing unit) of which the functions expand is capable of performing such processing, such as transparency processing or file external reference processing, which have not be sufficiently performed in a conventional rasterization processing unit (hereinafter, referred to as an old rasterization processing unit). On the other hand, a processing order of an over-printing process, a color management process, or the like is different between the new rasterization processing unit and the old rasterization processing unit. Therefore, there may cause a problem that a print result is different between when the new rasterization processing unit is used and when the old rasterization processing unit is used.

In order to satisfy various requests for print images, many of the image forming apparatuses such as copy machines, printers, or MFPs (multifunction peripherals) are equipped with both a new rasterization processing unit and an old rasterization processing unit in recent years. In such image forming apparatuses, one of the new rasterization processing unit and the old rasterization processing unit is designated and used. However, when a print result of an image forming apparatus is not the result intended by a user, the user has to change the designation to the other rasterization processing unit and perform printing again. In the configuration in which one of the new rasterization processing unit and the old rasterization processing unit is designated and used, the user may not determine which rasterization processing unit is more suitable merely by viewing one preview screen.

In order to avoid a troublesome work of repeatedly printing an image on a sheet, there are generally known technologies for previewing an image on a display apparatus before a print image is actually printed on a sheet (for example, see Japanese Unexamined Publication No. 2006-277605).

Japanese Unexamined Publication No. 2006-277605 discloses an information processing apparatus that displays print output images for a plurality of printing apparatuses so that a user can compare the print output images to each other.

However, in the information processing apparatus disclosed in Japanese Unexamined Publication No. 2006-277605, a user cannot compare the print output images to each other when one printing apparatus outputs the print output images using a plurality of different rasterization processing units.

The invention has been devised to resolve the above-mentioned problem. Accordingly, an object of the invention is to provide an image processing system, an image forming apparatus, an image processing program, and an image processing method configured such that a user can compare print output images to each other when one printing apparatus outputs the print output images using the plurality of different rasterization processing units.

SUMMARY

To achieve at least one of the above-mentioned objects or other object, an image processing system reflecting one aspect of the present invention comprises: a plurality of different rasterization processing units that each perform a rasterization process on print data to generate print image data; a print image data acquiring unit that acquires at least one of the print image data selectively using the plurality of rasterization processing units; and a display image generating unit that generates a display image of each of the plurality of print image data.

The plurality of rasterization processing units preferably perform the rasterization process on the print data in parallel to generate the plurality of print image data.

The image processing system preferably further comprises a display unit that displays the display image.

The display unit preferably displays the display images side-by-side.

The image processing system preferably further comprises a printing unit that prints print images based on the print image data selected from the plurality of print image data.

The image processing system preferably further comprises a print image data setting unit that causes a user to set the print image data to be transmitted to the printing unit among the plurality of print image data based on the display images.

A different portion between the display images generated for the plurality of print image data is preferably detected and the different portion is preferably drawn on the display images.

When any of the rasterization processes is completed, the display image of the print image data on which the rasterization process is completed is preferably generated and displayed and the print image data is preferably transmitted to the printing unit, as soon as an instruction to perform a printing process is given by a user.

When the print data has a PDF format, CPSI and APPE are preferably used as rasterization processing programs of the plurality of rasterization processing units.

The rasterization process applied to the print image data to be printed is preferably selected in units of a page.

The rasterization process applied to the print image data to be printed is preferably selected in units of a drawing object.

The objects, features, and characteristics of this invention other than those set forth above will become apparent from the description given herein below with reference to preferred embodiments illustrated in the accompanying drawings.

DETAILED DESCRIPTION (First Embodiment)

Figure 1:
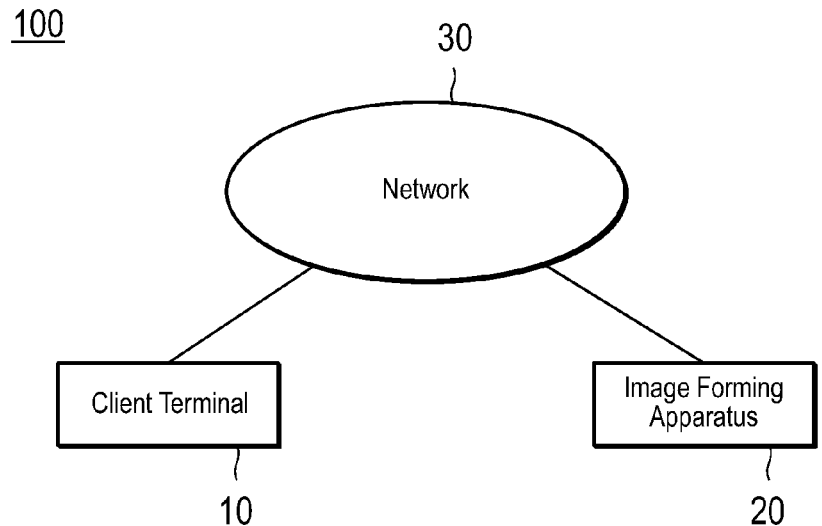
FIG. 1 is a schematic diagram illustrating the configuration of an image processing system according to a first embodiment of the invention.
Figure 2:
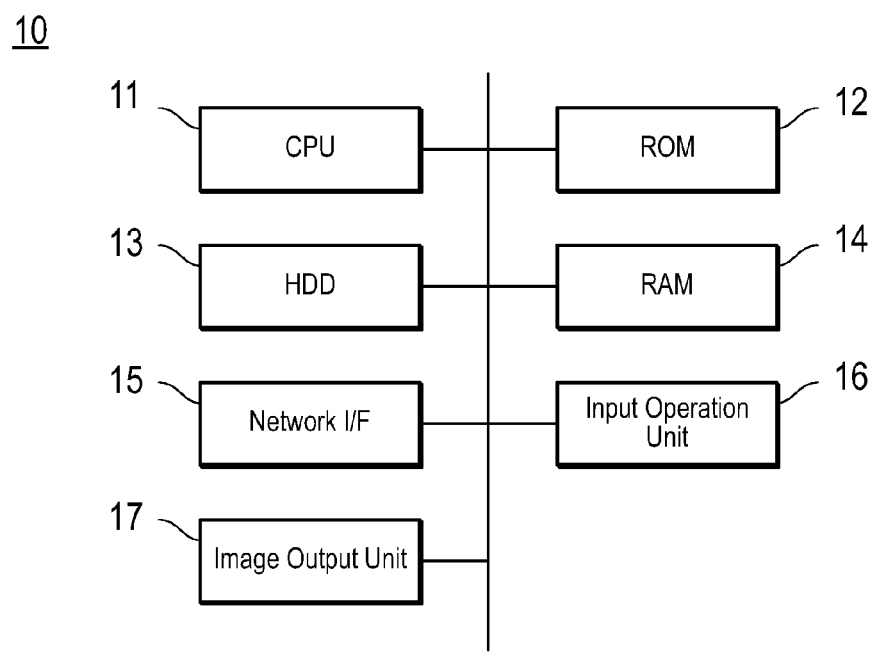
FIG. 2 is a schematic diagram illustrating a client terminal illustrated in FIG. 1.
Figure 3:
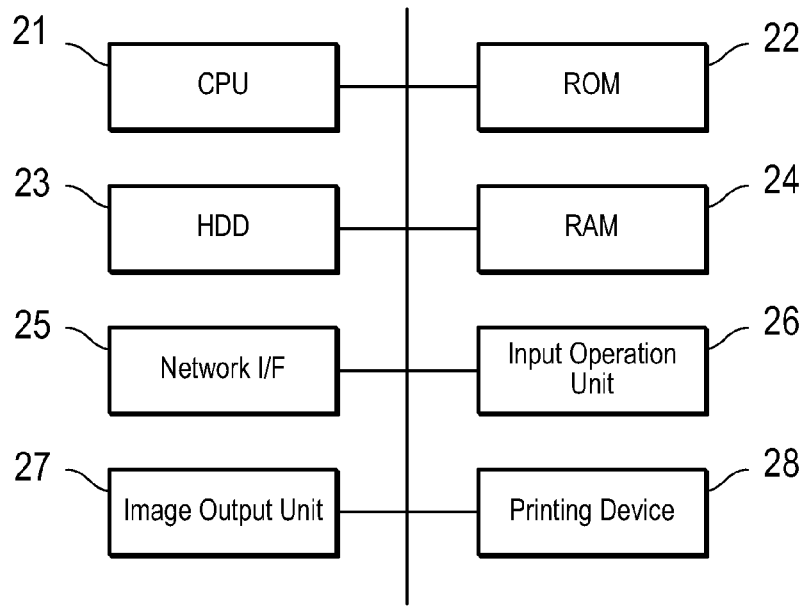
FIG. 3 is a schematic diagram illustrating the configuration of an image forming apparatus illustrated in FIG. 1.

Hereinafter, an image processing system, an image forming apparatus, an image processing program, and an image processing method according to embodiments of the invention will be described with reference to the drawings. FIG. 1 is a schematic diagram illustrating the configuration of an image processing system according to a first embodiment of the invention, FIG. 2 is a schematic diagram illustrating a client terminal illustrated in FIG. 1. FIG. 3 is a schematic diagram illustrating an image forming apparatus illustrated in FIG. 1.

As illustrated in FIG. 1, an image processing system 100 according to this embodiment includes a client terminal (personal computer) 10 and an image forming apparatus 20. The client terminal 10 and the image forming apparatus 20 are connected to each other so as to communicate with each other via a network 30.

The client terminal 10 may be, for example, a personal computer, a workstation, or a portable information terminal. The image forming apparatus 20 may be, for example, a printer, a copy machine, a facsimile apparatus, or a MFP having all of the functions of these apparatuses. The network 30 includes a LAN in which computers or network devices are connected in conformity with standards such as the Ethernet (registered trademark), a token ring, and an FDDI and a WAN in which LANs are connected to each other via dedicated lines.

The client terminal 10 generates a print job and transmits the print job to the image forming apparatus 20. The print job includes image data to be printed by the image forming apparatus 20. As illustrated in FIG. 2, the client terminal 10 includes a central processing unit (CPU) 11, a read-only memory (ROM) 12, a hard disk drive (HDD) 13, a random access memory (RAM) 14, a network interface (I/F) 15, an input operation unit 16, and an image output unit 17. These constituent elements are connected to each other to communicate with each other via a bus.

The CPU 11 executes an application program and a printer driver, generates a print job, and transmits the print job to the image forming apparatus 20. The application program and the printer driver are stored in advance in the ROM 12, which is a non-volatile storage device, or the HDD 13, which is a large-capacity storage device, and are transmitted to the RAM 14, which is a volatile storage device, when the CPU 11 executes the application program and the printer driver.

In this embodiment, the application program includes an input image generation program, a RIP selection program, and a preview program. These software programs may be configured each in an independent form or may be configured in a form in which a plurality of programs is integrated.

The input image generation program is, for example, a software program such as a word processing program or a drawing program. Specifically, the input image generation program generates an input image, receives a print instruction from a user and gives an instruction to a printer driver to generate a print job based on the generated input image. In this embodiment, the input image generation program includes a graphical user interface (GUI) fulfilling a role of an interface between a user and the client terminal 10. Accordingly, the user can input information regarding a print instruction using the input operation unit 16 on an input screen of the GUI displayed on the image output unit 17.

The printer driver generates a print job based on an instruction of the input image generation program. The print job includes print data formed by at least one page and page information regarding each page to be printed. Each page of the print data includes at least one drawing object (hereinafter, referred to as an object). The print job is transmitted to the image forming apparatus 20 via the network I/F 15.

The page information includes, for example, a page number, a page size (a size in a main scanning direction and a size in a sub-scanning direction), and a page resolution for each page.

The print data includes a data file and a layout file. As the data file, a file described in a page description language such as the postscript (PS (registered trademark)), the portable document format (PDF), the printer control language (PCL), or the XML paper specification (XPS) is used. Further, an object described in the PS is defined in the layout file.

The RIP selection program includes a GUI, and fulfills a role of an interface between a user and the client terminal 10 when the user selects the rasterization processing unit. The preview program includes a GUI and displays a display image generated based on the print image data generated based on the print data subjected to the rasterization process on the image output unit 17. The RIP selection program and the preview program will be described later in detail.

The ROM 12 and the HDD 13 store various programs and parameters in addition to the application programs and the printer driver. The RAM 14 stores calculation results or the like calculated by the CPU 11 when the application programs are executed.

The network I/F 15 is connected to the image forming apparatus 20 via the network 30, and transmits and receives data between the client terminal 10 and the image forming apparatus 20. The network I/F 15 is included in the client terminal 10 or is sometimes mounted as an expansion device (LAN board) on the client terminal 10.

The input operation unit 16 receives a user's input and delivers the user's input to the CPU 11. The input operation unit 16 includes a pointing device such as a keyboard or a mouse and receives characters, various settings, or various instructions from the user.

The image output unit 17 displays various kinds of information such as user's input reception screens, preview screens, and processing results. The image output unit 17 includes, for example, a liquid crystal display, a plasma display, or a cathode ray tube (CRT).

Next, as illustrated in FIG. 3, the image forming apparatus 20 includes a CPU 21, a ROM 22, an HDD 23, a RAM 24, a network I/F 25, an input operation unit 26, an image output unit 27, and a printing device 28. These constituent elements are connected to each other to communicate with each other via a bus. Among the constituent elements, the CPU 21, the ROM 22, the HDD 23, the RAM 24, and the network I/F 25 fulfill a role of a print controller. The print controller may be received in a casing different from the casing of the input operation unit 26, the image output unit 27, and the printing device 28.

The CPU 21 executes a program (hereinafter, referred to as an image processing program) that causes the image forming apparatus 20 to operate. The CPU 21 functions as a print image data acquiring unit and a display image generating unit by executing the image processing program. The CPU 21 functions as a rasterization processing unit by executing a rasterization processing program. The image processing program and the rasterization processing program are stored in advance in the ROM 22, which is a non-volatile storage device, or the HDD 23, which is a large-capacity storage device, and are transmitted to the RAM 24, which is a volatile storage device, when the CPU 21 executes the image processing program and the rasterization processing program. In this embodiment, the CPU 21 is preferably a multi-core CPU in order to execute a plurality of rasterization processes in parallel.

The network I/F 25 is connected to the client terminal 10 via the network 30, and transmits and receives data between the image forming apparatus 20 and the client terminal 10.

The input operation unit 26 receives a user's input and delivers the user's input to the CPU 21. The input operation unit 26 includes an input device such as a numerical keypad or a touch panel and receives various settings or various instructions from the user.

The image output unit 27 displays various kinds of information such as user's input reception screens and processing results. The image output unit 27 includes, for example, a liquid crystal display. The liquid crystal display and a touch panel are integrally formed as a touch panel display.

The printing device 28, which serves as a printing unit, prints an image on a sheet based on the print image data using a known image generation process such as an electrophotographic process. The detail description of the printing device 28 will be omitted.

Figure 4:
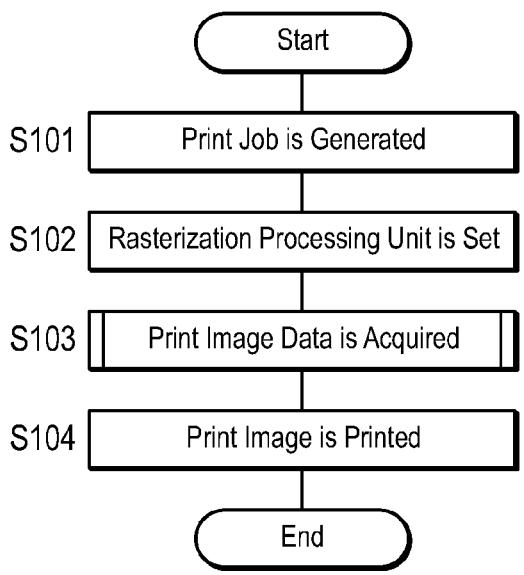
FIG. 4 is a flowchart for describing the overview of a processing order of an image processing method according to the first embodiment of the invention.
Figure 5:
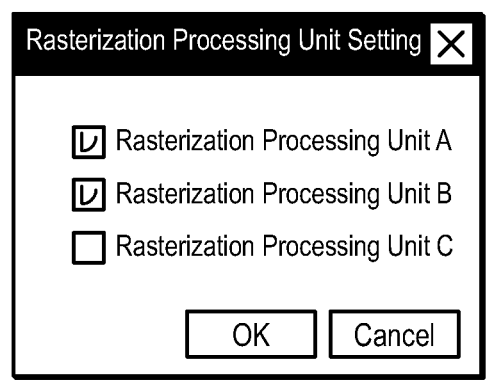
FIG. 5 is a diagram illustrating an example of a setting screen of a rasterization processing unit according to the first embodiment of the invention.

Hereinafter, a processing order of an image processing method according to this embodiment will be described below with reference to FIG. 4 and FIG. 5. FIG. 4 is a flowchart illustrating the overview of the processing order of the image processing method according to this embodiment. FIG. 5 is a diagram illustrating an example of a setting screen of the rasterization processing unit according to this embodiment.

As illustrated in FIG. 4, a print job is first generated (step S101). Specifically, the client terminal 10 receives a user's instruction to activate the input image generation program via the input operation unit 16. The CPU 11 generates an input image by starting execution of the input image generation program, generates a print job using the printer driver by receiving an instruction to process printing from the user, and transmits the print job to the image forming apparatus 20 via the network 30. The CPU 21 of the image forming apparatus 20 receives the print job via the network I/F 25.

Next, the rasterization processing unit is set (step S102). The CPU 21 executes the RIP selection program and sets the rasterization processing unit through, for example, a setting screen of the rasterization processing unit illustrated in FIG. 5. In this embodiment, a case is exemplified in which setting is performed in the range from one rasterization processing unit to three different rasterization processing units. However, the number of rasterization processing units to be set is not limited to one to three.

As illustrated in FIG. 5, when the user ticks a check box corresponding to the rasterization processing unit to be used among rasterization processing units A to C and presses down the "OK" button, the rasterization processing unit to be used is set. The CPU 11 transmits information regarding the set rasterization processing unit to the image forming apparatus 20. In the example illustrated in FIG. 5, information regarding the rasterization processing units A and B as the rasterization processing units to be used are transmitted to the image forming apparatus 20. The CPU 21 of the image forming apparatus 20 receives the information regarding the rasterization processing units via the network I/F 25.

As a rasterization processing program of the rasterization processing unit, for example, a configurable postscript interpreter (CPSI), an Adobe PDF print engine (APPE), or the like can be used. The CPSI is a rasterization processing program which has been used in many image forming apparatuses from the past. On the other hand, the APPE is a rasterization processing program which has recently been used.

In this embodiment, an object rasterizing process, an overprinting process, and a color management process are called together a rasterization process. The CPU 21 performs the rasterization process using a rasterization processing program.

Next, the print image data is acquired (step S103). The CPU 21 analyzes the print job received in step S101 and acquires the print data. Then, the CPU 21 acquires the print image data selectively using the plurality of different rasterization processing units set in step S102. The image forming apparatus 20 generates a display image regarding each of the print image data acquired by the plurality of different rasterization processing units. The generated display images are transmitted to the client terminal 10 and are displayed on the image output unit 17. The process of acquiring the print image data will be described in detail below with reference to FIG. 6.

Next, the print image is printed (step S104). The CPU 21 transmits the print image data acquired in step S103 to the printing device 28. The printing device 28 prints the print images on a sheet based on the print image data.

According to the process of the flowchart illustrated in FIG. 4, as described above, the client terminal 10 generates a print job and transmits the print job and information regarding the rasterization processing units to be used to the image forming apparatus 20. The image forming apparatus 20 acquires the print image data selectively using the plurality of different rasterization processing units. Then, the image forming apparatus 20 generates the display image regarding each of the print image data. The generated display images are transmitted to the client terminal 10 and are displayed on the image output unit 17. The CPU 21 transmits the selected print image data to the printing device 28. The printing device 28 prints the print images on a sheet based on the print image data.

Figure 6:
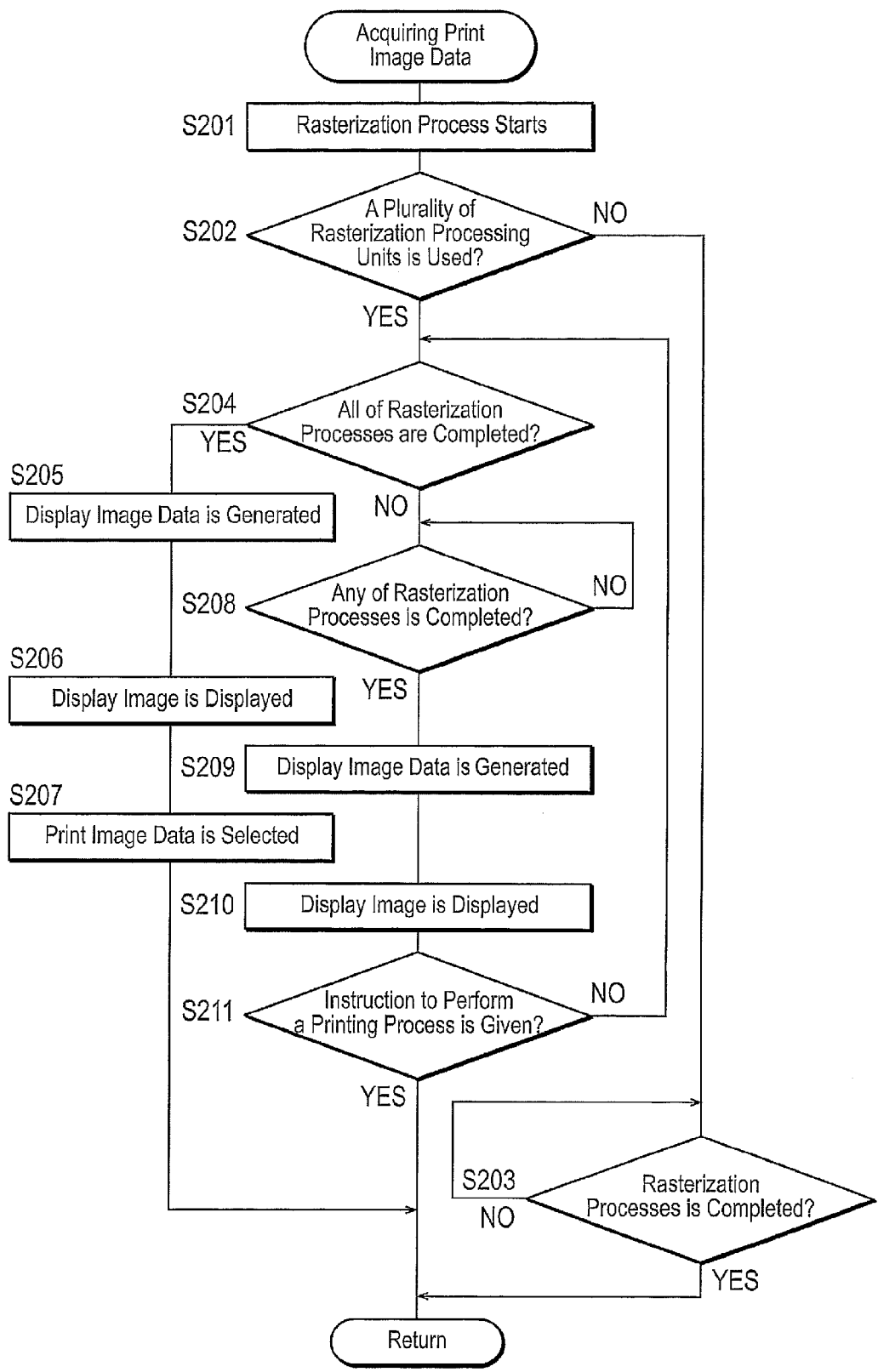
FIG. 6 is a flowchart for describing the process of S103 of FIG. 4.

Next, a process of acquiring the print image data will be described in detail with reference to FIGS. 6 to 9. FIG. 6 is a flowchart for describing the process of S103 of FIG. 4.

As illustrated in FIG. 6, the rasterization process first starts (step S201). The CPU 21 determines a rasterization processing unit to be used in the rasterization process based on the received information regarding the rasterization processing units and starts the rasterization process on the print data using the rasterization processing unit. In this embodiment, when one rasterization processing unit is used, one rasterization process is performed on the print data. When a plurality of rasterization processing units is used, a plurality of rasterization processes is performed in parallel on the print data. In a case in which there is a restriction on hardware, for example, in a case in which the CPU 21 is a single core CPU, the rasterization processes are performed one by one even when the plurality of rasterization processing units are used.

Next, it is determined whether or not a plurality of rasterization processing units is used (step S202). When a plurality of rasterization processing units is not used, that is, one rasterization processing unit is used (NO in step S202), the CPU 21 causes the process to proceed to step S203. When the rasterization process ends (YES in step S203), the process of step S104 in FIG. 4 is performed. Conversely, when the rasterization process does not end (NO in step S203), the process stays until end of the rasterization process.

Conversely, when a plurality of rasterization processing units is used (YES in step S202), it is determined whether or not all of the rasterization processes are completed (step S204). When all of the rasterization processes are completed (YES in step S204), the display image is generated (step S205). Specifically, the CPU 21 generates the display image data based on each print image data generated through the rasterization process. Since the process of generating the display image data from the print image data is the same as the process performed in a conventional image forming apparatus, the detailed description will be omitted.

Next, the display image is displayed (step S206) The CPU 21 transmits the display image data to the client terminal 10 via the network I/F 25. The client terminal 10 stores the received display image data in the RAM 14. The CPU 11 delivers the display image data to the image output unit 17 by executing the preview program, and then the image output unit 17 displays the display image based on the display image data.

Figure 7:
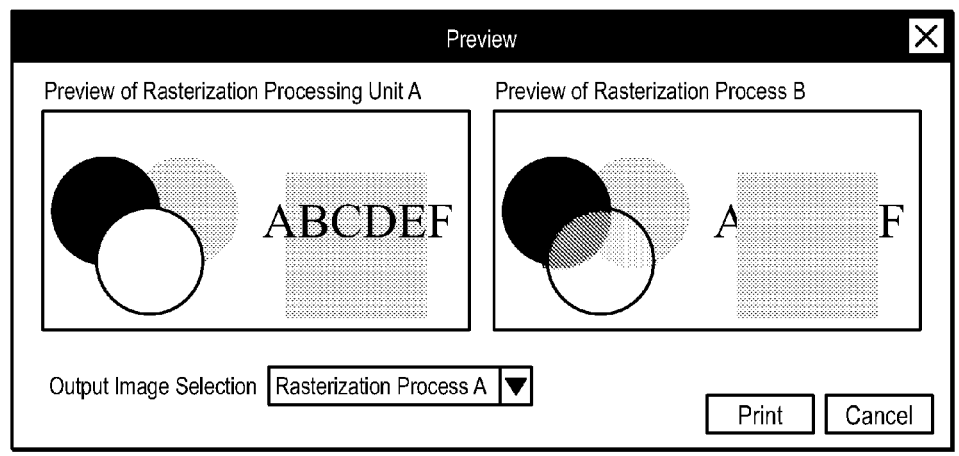
FIG. 7 is a diagram illustrating an example of a preview screen when two display images are displayed in parallel according to the first embodiment of the invention.
Figure 8:
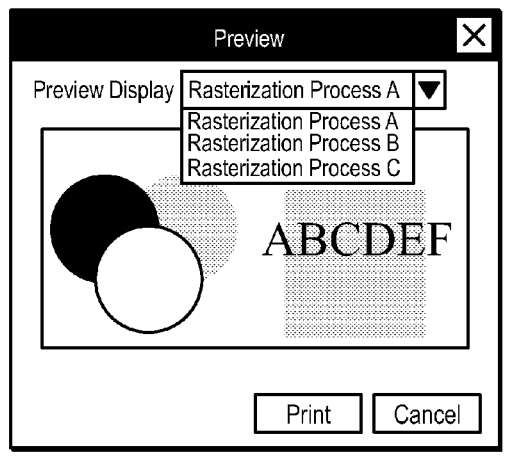
FIG. 8 is a diagram illustrating an example of a preview screen when a display image to be displayed is selected in a pull-down menu according to the first embodiment of the invention.

Hereinafter, a case in which two pieces of display image data are generated will be described giving an example of a preview screen in which two display image data are used. FIG. 7 is a diagram illustrating an example of the preview screen, when two display images are displayed in parallel. FIG. 8 is a diagram illustrating an example of a preview screen, when a display image to be displayed is selected in a pull-down menu.

In the example illustrated in FIG. 7, the display image generated based on the print image data generated based on the print data processed by the rasterization processing unit A is displayed to the left of the preview screen. As illustrated in the drawing, three graphic objects with white, black, and gray disc shapes are drawn in a partial overlap manner to the left of the display image. More specifically, the graphic objects are drawn in the overlap manner in the order of the gray, black, and white so that the white graphic object is shown at the forefront. Since any graphic object is not transparent, the white graphic object seems to be present at the forefront to the user.

A character object of "ABCDEF" and a rectangular image object are drawn in a partial overlap manner to the right of the display image. More specifically, the character object of "ABCDEF" and the rectangular image object are drawn in the overlap manner in this order so that the rectangular image object is shown at the front. Since the rectangular image object is transparent, the user can view the character object of "ABCDEF" through the rectangular image object.

On the other hand, the display image generated based on the print image data generated based on the same print data processed by the rasterization processing unit B is displayed to the right of the preview screen. As illustrated in the drawing, three graphic objects with white, black, and gray disc shapes are drawn in a partial overlap manner to the left of the display image. More specifically, the graphic objects are drawn in the overlap manner in the order of the gray, black, and white so that the white graphic object is shown at the forefront. Unlike the case of the rasterization processing unit A, since the graphic object with the white disc shape is transparent, the user can view the graphic objects with the black and gray disc shapes through the graphic object with the white disc shape.

A character object of "ABCDEF" and a rectangular image object are drawn in a partial overlap manner to the right of the display image. More specifically, the character object of "ABCDEF" and the rectangular image object are drawn in the overlap manner in this order so that the rectangular image object is shown at the front. Unlike the case of the rasterization processing unit A, since the rectangular image object is not transparent, the user may not view the character object of "ABCDEF" through the rectangular image object.

In the example illustrated in FIG. 8, one of the display images generated based on the print image data generated based on the print data subjected to the rasterization process by the rasterization processing units A and B is displayed on the preview screen. The display image can be changed by a pull-down menu of "Preview Display" in the upper side of the preview screen.

As described above, the result of the rasterization process is different due to a difference between the rasterization processing units even for the same print data in some cases. For example, in the example of three graphic objects with the disc shapes, there is a difference in the appearance of three graphic objects with the disc shapes. This is because the processing order of the color management process and the over-printing process is different between the rasterization processing unit A and the rasterization processing unit B. Hereinafter, the processing order of the color management process and the over-printing process in the rasterization processing units A and B will be described with reference to FIG. 9A and FIG. 9B.

Figure 9A:
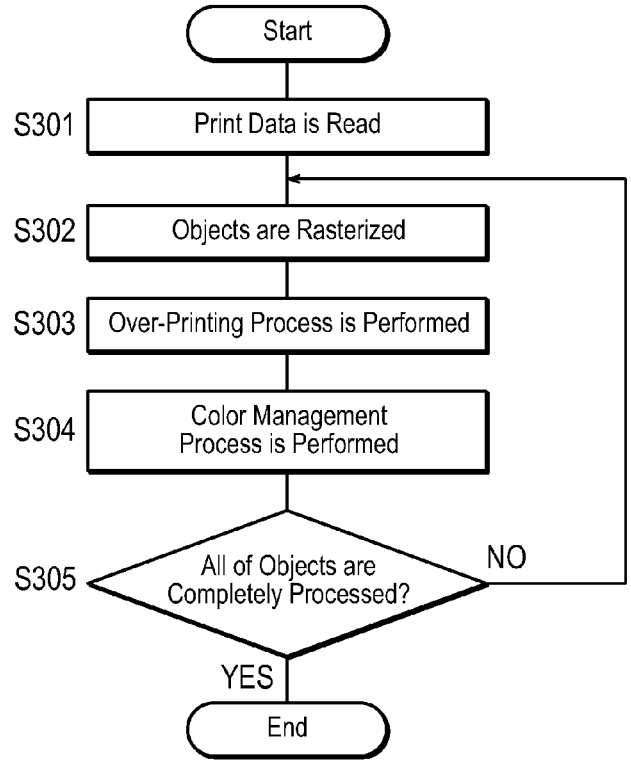
FIG. 9A is a flowchart for describing a rasterization process performed using a rasterization processing unit A according to the first embodiment of the invention.
Figure 9B:
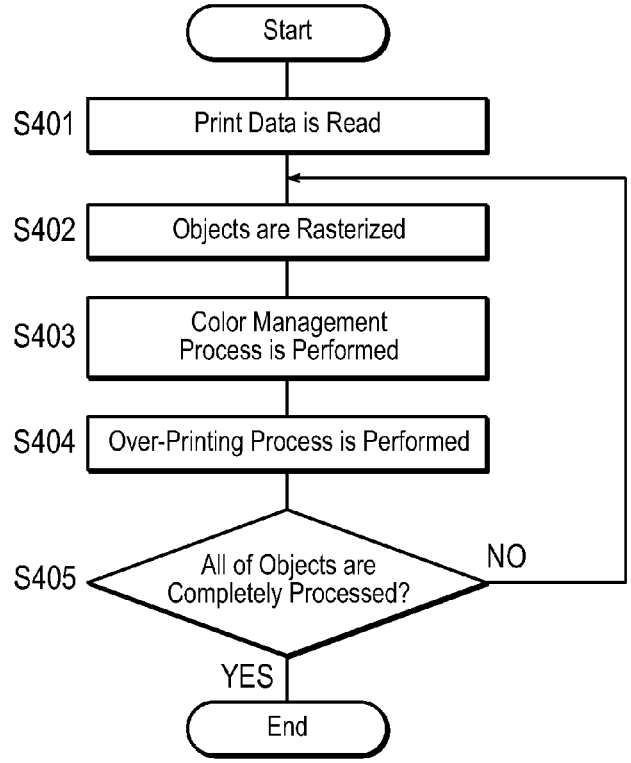
FIG. 9B is a flowchart for describing a rasterization process performed using a rasterization processing unit B according to the first embodiment of the invention.

FIG. 9A is a flowchart illustrating the rasterization process performed using the rasterization processing unit A. FIG. 9B is a flowchart illustrating the rasterization process performed using the rasterization processing unit B.

In the rasterization process performed using the rasterization processing unit A, the print data is first read (step S301), as illustrated in FIG. 9A. The CPU 21 reads the print data acquired by analyzing the received print job into the RAM 24.

Next, objects are rasterized (step S302). The CPU 21 rasterizes the print data for each object.

Next, the over-printing process is performed (step S303). The CPU 21 superposes the objects subjected to the rasterization process.

Next, the color management process is performed (step S304). The CPU 21 performs color adjustment on the objects superposed on each other.

Next, it is determined whether or not all of the objects are completely processed (step S305). When all of the objects are completely processed (YES in step S305), the process ends. Conversely, when all of the objects are not completely processed (NO in step S305), the process proceeds to step S302.

On the other hand, in the rasterization process performed using the rasterization processing unit B, as illustrated in FIG. 9B, the color management process is performed on the rasterized objects, and then the over-printing process is performed.

According to the processes of the flowcharts of FIG. 9A and FIG. 9B, the result of the rasterization processes are different from each other due to the difference in the processing order of the over-printing process and the color management process.

Next, referring back to FIG. 6, the print image data is selected (step S207). Although the same print data is processed, as described above, there is a difference between the generated print image data in some cases due to the difference in the rasterization processing unit. In this embodiment, the user can select the rasterization process corresponding to a more appropriate display image by comparing the display images displayed on the preview screen.

In the client terminal 10, the CPU 11 functions as a print image data setting unit and causes the user to set the print image data to be transmitted to the printing device 28 based on the display images among the plurality of print image data. Specifically, in the example illustrated in FIG. 7, the user selects one rasterization process in the pull-down menu of the "Output Image Selection" in the lower side of the preview screen and presses down the "Print" button. The CPU 11 transmits the information regarding the selected rasterization processing unit to the image forming apparatus 20. On the other hand, in the example illustrated in FIG. 8, the user selects a rasterization process in the pull-down menu of the "Preview Display", and then presses down the "Print" button.

The image forming apparatus 20 determines print image data to be actually printed based on the received information regarding the rasterization process. Then, the CPU 21 transmits the print image data to be printed to the printing device 28 and causes the process to proceed to step S104 of FIG. 4.

Conversely, when all of the rasterization processes are not completed (NO in step S204), it is determined whether or not any of the rasterization process is completed in step S208. When no rasterization is completed (NO in step S208), the process waits until any of the rasterization process is completed.

Conversely, when any of the rasterization process is completed (YES in step S208), the display image data is generated (step S209). The CPU 21 generates the display image data based on the print image data generated through the rasterization process. When one piece of print image data is generated, one piece of display image data is generated. When a plurality of print image data is generated, a plurality of display image data is generated.

Figure 10:
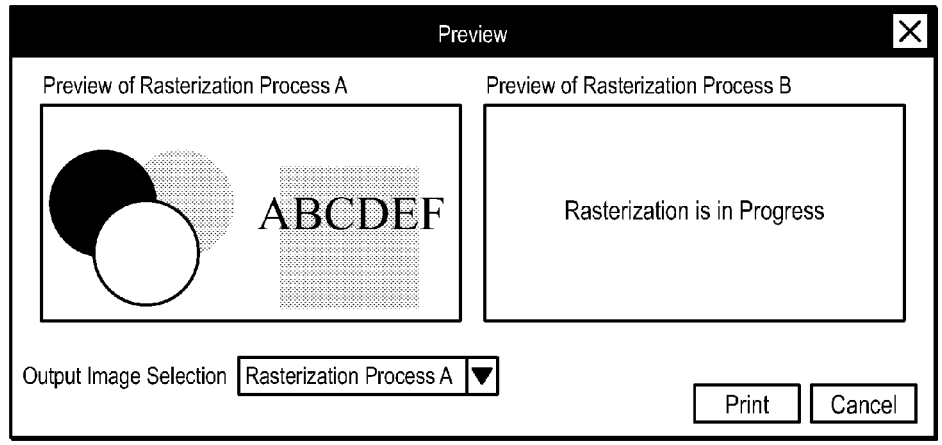
FIG. 10 is a diagram illustrating an example of a preview screen when a display image is generated by completing the rasterization process A according to the first embodiment of the invention.

Next, the display image is displayed (step S210) The CPU 21 transmits the display image data to the client terminal 10 via the network I/F 25. The client terminal 10 stores the received display image data in the RAM 14. Then, the CPU 11 delivers the display image data to the image output unit 17. The image output unit 17 displays the display image based on the display image data. Hereinafter, a case in which two rasterization processing units are set, one of the rasterization processes is completed, and the display image is generated will be described giving an example of a preview screen. FIG. 10 is a diagram illustrating an example of a preview screen, when the rasterization process A is completed and the display image is generated.

As illustrated FIG. 10, the display image generated based on the print image data generated based on the print data subjected to the rasterization process by the rasterization process A is displayed to the left of the preview screen. On the other hand, since the rasterization process is not completed for the rasterization process B, no display image is displayed and a message of "Rasterization is in Progress." is displayed instead.

Next, it is determined whether or not an instruction to perform a printing process is given (step S211). In this embodiment, when any of the rasterization process is completed, a print image can be printed without waiting completion of all the rasterization processes. Accordingly, even in a case in which a rasterization processing unit for which a long processing time is required is set, a print image can start to be printed when a rasterization process performed using the different rasterization processing unit for which shorter processing time is required is completed. The user confirms the display image and gives a printing instruction, when it is determined that there is no problem for the print image. More specifically, in FIG. 10, when the user selects one rasterization process in the pull-down menu of the "Output Image Selection" in the lower side of the preview screen and presses down the "Print" button, the process proceeds to a process of printing the print image. When the printing instruction is given (YES in step S211), the process proceeds to step S104 of FIG. 4.

Conversely, when the printing instruction is not given (NO in step S211), the process proceeds to step S204.

According to the process of the flowchart illustrated in FIG. 6, as described above, when the plurality of rasterization processing units are set, the display images of the plurality of print image data generated by the plurality of rasterization processing units are generated and displayed, and the print image data to be transmitted to the printing device 28 is selected among the plurality of print image data. Further, when any of the rasterization process is completed, the display image of the print image data obtained by completing the rasterization process is generated and displayed, and the print image data is transmitted to the printing device 28 as soon as the printing instruction is given.

In the above-described embodiment, as described above, the following advantages can be obtained.

(a) The display images of the print image data generated using the plurality of rasterization processing units are generated. Accordingly, the user can determine which rasterization processing unit is suitable before actual printing of a print image on a sheet by comparing the display images displayed on the display unit. As a result, it is possible to avoid the troublesome work of changing designation to another rasterization processing unit as the print result of the image forming apparatus 20 is not the result intended by the user and of inevitably performing printing again. Therefore, the user can obtain an appropriate print result efficiently.

(b) When any of the rasterization process is completed, the print image can be printed without waiting the completion of all the rasterization processes. Accordingly, even in the case in which the rasterization processing unit for which a long processing time is required is set, the print image can start to be printed when the rasterization process performed using the different rasterization processing unit for which shorter processing time are required is completed.

(Second Embodiment)

In the first embodiment, the case has been described in which the plurality of display images of the print image data generated using the plurality of rasterization processing units are displayed so that a user can compare the display images.

In a second embodiment, a case in which a different portion is emphasized and displayed will be described in addition to the display of the plurality of display images so that the user can compare the display images.

Hereinafter, an image processing system, an image forming apparatus, an image processing program, and an image processing method according to this embodiment will be described with reference to FIG. 11. A configuration of this embodiment is the same as the configuration of the first embodiment except that a different portion between the plurality of display images is emphasized and displayed. Hereinafter, the description of the same configuration as that of the first embodiment is not repeated to avoid repeated description.

Figure 11:
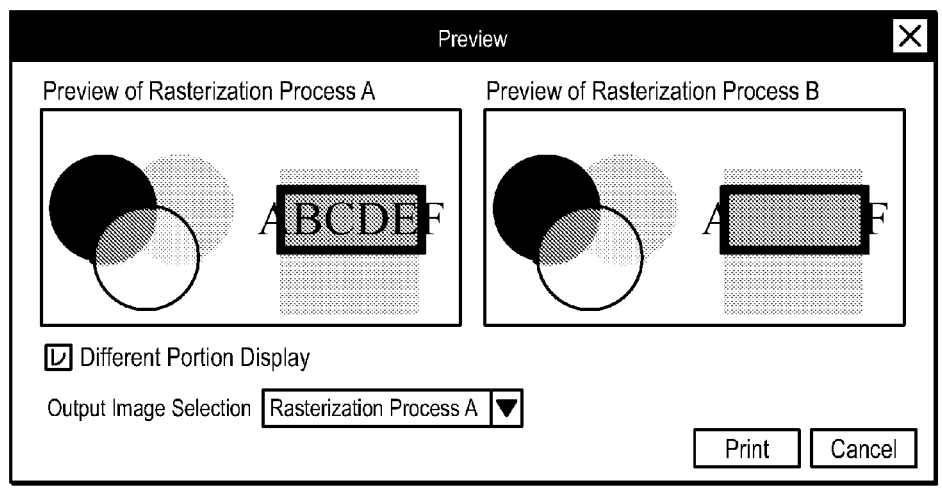
FIG. 11 is a diagram illustrating an example of a preview screen displayed by emphasizing a portion in which there is a difference between display images according to a second embodiment of the invention.

FIG. 11 is a diagram illustrating an example of a preview screen in which a different portion between display images is emphasized and displayed according to this embodiment.

As illustrated in FIG. 11, the display image generated based on the print image data generated based on the print data processed by the rasterization processing unit A is displayed to the left of the preview screen. Three graphic objects with white, black, and gray disc shapes are drawn in a partial overlap manner to the left of the display image. More specifically, the graphic objects are drawn in the overlap manner in the order of the gray, black, and white so that the white graphic object is shown at the forefront. Since the graphic object with the white disc shape is transparent, the user can view the graphic objects with the black and gray disc shapes through the graphic object with the white disc shape.

A character object of "ABCDEF" and a rectangular image object are drawn in a partial overlap manner to the right of the display image. More specifically, the character object of "ABCDEF" and the rectangular image object are drawn in the overlap manner in this order so that the rectangular image object is shown at the front. Since the rectangular image object is transparent, the user can view the character object of "ABCDEF" through the rectangular image object.

On the other hand, the display image generated based on the print image data generated based on the same print data processed by the rasterization processing unit B is displayed to the right of the preview screen. As in the case of the rasterization processing unit A, three graphic objects with white, black, and gray disc shapes are drawn in a partial overlap manner to the left of the display image. More specifically, the graphic objects are drawn in the overlap manner in the order of the gray, black, and white so that the white graphic object is shown at the forefront. Since the graphic object with the white disc shape is transparent, the user can view the graphic objects with the black and gray disc shapes through the graphic object with the white disc shape.

A character object of "ABCDEF" and a rectangular image object are drawn in a partial overlap manner to the right of the display image. More specifically, the character object of "ABCDEF" and the rectangular image object are drawn in the overlap manner in this order so that the rectangular image object is shown at the front. Unlike the case of the rasterization processing unit A, since the rectangular image object is not transparent, the user may not view the character object of "ABCDEF" through the rectangular image object.

When the check box of "Different Portion Display" is ticked on the preview screen illustrated in FIG. 11, a different portion between the two left and right display images of the preview screen is emphasized and displayed. Specifically, between the two left and right display images, there is a difference with regard to whether the character object of "ABCDEF" can be viewed through the rectangular image object. The CPU 11 draws a rectangular frame as the different portion in the overlapping portion between the character object of "ABCDEF" and the rectangular image object of the two display images, and the image output image 17 displays the two display images in which the rectangular frame is drawn.

To detect the different portion between the display images, for example, pixels corresponding to the left and right display images are simply compared to each other. Alternatively, another known method may be used. Further, the method of emphasizing the different portion between the display images is not limited to the method of drawing the frame.

In the above-described embodiment, as described above, the following advantage can be obtained in addition to the advantages of the first embodiment.

(c) Since the different portion between a plurality of display images is emphasized and displayed, the user can easily comprehend the different portion between the display images.

(Third Embodiment)

In the first embodiment, the case has been described in which a rasterization process of using the print image data to be printed is selected in units of a print job. In a third embodiment, a case will be described in which a rasterization process of using print image data to be printed is selected not in units of a print job but in units of a page or a drawing object.

Hereinafter, an image processing system, an image forming apparatus, an image processing program, and an image processing method according to this embodiment will be described with reference to FIG. 12. A configuration of this embodiment is the same as the configuration of the first embodiment except that a rasterization process is selected in units of a page or units of a drawing object. Hereinafter, the description of the same configuration as that of the first embodiment is not repeated to avoid repeated description.

Figure 12:
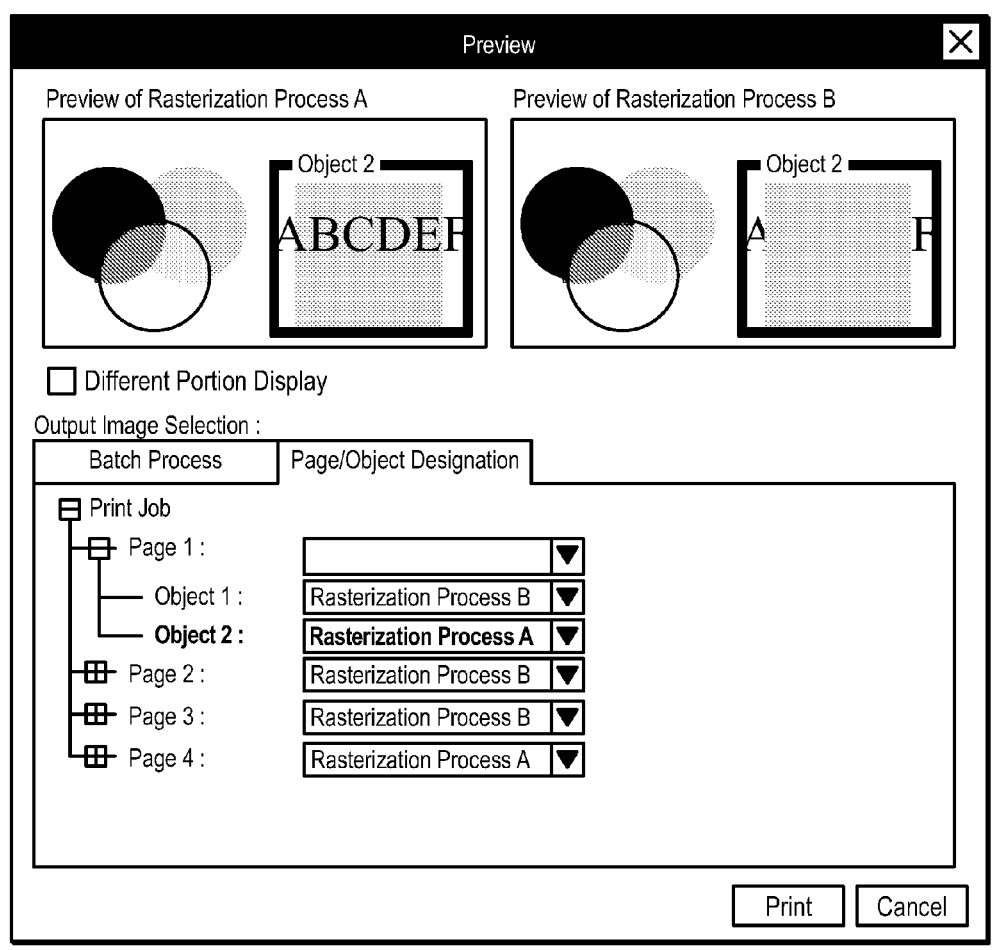
FIG. 12 is a diagram illustrating an example of a preview screen on which a rasterization process applied to print image data to be printed is selected in units of a page or units of a drawing object according to a third embodiment of the invention.

FIG. 12 is a diagram illustrating an example of a preview screen on which a rasterization process applied to print image data to be printed is selected in units of a page or units of a drawing object according to this embodiment.

As illustrated in FIG. 12, when a tab of "Page/Object Designation" is selected, a rasterization process of using print image data to be printed can be selected in units of a page or units of an object. For example, a rasterization process can be selected for each page of first to fourth pages included in a print job. Further, for example, each rasterization process can be set for each of Object 1 and Object 2 included in the first page. Accordingly, optimum print image data can be obtained by combining the pages and objects subjected to the optimum rasterization process.

On the other hand, when a tab of "Batch Process" is selected, a rasterization process can be selected in units of a print job, as described in the first embodiment.

Further, a page or an object to be set is preferably emphasized and displayed on a display image. In the example illustrated in FIG. 12, since Object 2 is an object to be set, the object corresponding to Object 2 of the display image is surrounded by a rectangular frame and is displayed.

In the above-described embodiment, as described above, the following advantage can be obtained in addition to the advantages of the first and second embodiments.

(d) Since a rasterization process used in print image data to be printed can be selected in units of a page or units of an object, it is possible to obtain the print image data subjected to the rasterization process by a rasterization processing unit suitable for each page or each object.

(Fourth Embodiment)

In the first to third embodiments, the cases have been described in which the image forming apparatus performs the rasterization process, the process of generating the display image, and the process of acquiring the print image data. In a fourth embodiment, a case in which a client terminal performs these processes will be described. Hereinafter, the description of the same configuration as that of the first embodiment is not repeated to avoid repeated description.

Next, an image processing system, an image forming apparatus, an image processing program, and an image processing method according to this embodiment will be described with reference back to FIGS. 1 to 4.

The CPU 11 acquires print data by executing an application program and a printer driver, generating a print job, and analyzing the print job. In this embodiment, the CPU 11 functions as a print image data acquiring unit and a display image generating unit by executing an image processing program. Further, the CPU 11 functions as a rasterization processing unit by executing the rasterization processing program.

In this embodiment, the application program, the printer driver, the image processing program, and the rasterization processing program are stored in advance in the ROM 12, which is a non-volatile storage device, or the HDD (Hard Disk Drive) 13 which is a large-capacity storage device, and thus are transmitted to the RAM 14, which is a volatile storage device, when the CPU 11 executes the application program, the printer driver, the image processing program, and the rasterization processing program. In this embodiment, the CPU 11 is preferably a multi-core CPU to execute a plurality of rasterization processes in parallel.

In this embodiment, the client terminal 10 acquires the print, data and acquires the print image data selectively using the plurality of different rasterization processing units. Then, the client terminal 10 generates a display image of each of the print image data. The generated display images are displayed on the image output unit 17. The client terminal 10 transmits the selected print image data to the printing device 28 of the image forming apparatus 20 via the network 30, and the printing device 28 prints the print image on a sheet based on the print image data.

In the above-described embodiment, as described above, the following advantage can be obtained in addition to the advantages of the first to third embodiments.

(e) Since the client terminal 10 performs the rasterization process, the process of generating the display images, and the process of acquiring the print image data, it is possible to prevent the load from being imposed to the CPU 21 of the image forming apparatus 20.

In the embodiments, as described above, the image processing system, the image forming apparatus, the image processing program, and the image processing method of the invention have been described. However, it should be apparent those skilled in the art that additions, modifications, omissions of the invention may, of course, be made within the scope of the technical spirit.

For example, in the first to fourth embodiments, the cases have been described in which a user's input is received through the input operation unit of the client terminal. However, the invention is not limited thereto. A user's input may be also received through the input operation unit of the image forming apparatus.

In the first to fourth embodiments, the cases have been described in which the image output unit of the client terminal displays the display images. However, the invention is not limited thereto. The image output unit of the image forming apparatus may also display the display images.

In the first to third embodiments, the cases have been described in which the image forming apparatus performs the rasterization process, the process of generating the display images, and the process of acquiring the print image data. In the fourth embodiment, the case has been described in which the client, terminal performs the rasterization process, the process of generating the display images, and the process of acquiring the print image data. However, the invention is not limited thereto. For example, the rasterization process, the process of generating the display images, and the process of acquiring the print image data may be performed by the CPU of the image forming apparatus or the CPU of the client terminal in consideration of the load state of the CPU of the image forming apparatus and the CPU of the client terminal.

What is claimed is:

1. An image processing system comprising:
    a plurality of different rasterization processing units that respectively perform different rasterization processes on print data to generate a plurality of print image data;
    a print image data acquiring unit that acquires at least one of the print image data selectively using the plurality of rasterization processing units;
    a display image generating unit that generates a display image of each of the plurality of print image data,
    wherein each of the respective different rasterization processes includes an over-printing process and a color management process, and
    wherein a processing order of the over-printing process and the color management process are different in the respective different rasterization processes, such that results of the respective different rasterization processes are different from each other.

2. A non-transitory computer-readable recording medium having stored thereon an image processing program that is executable a computer to cause the computer to execute functions comprising:
    performing respective different rasterization processes on print data using a plurality of different rasterization processing units to generate a plurality of print image data, and acquiring at least one of the print image data selectively using the plurality of different rasterization processing units; and
    generating a display image of each of the plurality of print image data,
    wherein each of the respective different rasterization processes includes an over-printing process and a color management process, and
    wherein a processing order of the over-printing process and the color management process are different in the respective different rasterization processes, such that results of the respective different rasterization processes are different from each other.

3. An image processing method for an image processing apparatus, the method comprising:
    performing respective different rasterization processes on print data using a plurality of different rasterization processing units to generate a plurality of print image data, and acquiring at least one of the print image data selectively using the plurality of different rasterization processing units; and
    generating a display image of each of the plurality of print image data,
    wherein each of the respective different rasterization processes includes an over-printing process and a color management process, and
    wherein a processing order of the over-printing process and the color management process are different in the respective different rasterization processes, such that results of the respective different rasterization processes are different from each other.

* * * * *